United States Patent
Braum

[11] Patent Number: 6,022,086
[45] Date of Patent: Feb. 8, 2000

[54] ELECTROMAGNETIC VALVE WITH PRESSURE CONTROL FUNCTION

[76] Inventor: Wolfgang Braum, Oberhainerweg 36, Wehrheim 1/Ts, Germany, D-61273

[21] Appl. No.: 08/737,837
[22] PCT Filed: Mar. 19, 1996
[86] PCT No.: PCT/EP96/01162
  § 371 Date: Jul. 20, 1998
  § 102(e) Date: Jul. 20, 1998
[87] PCT Pub. No.: WO96/29219
  PCT Pub. Date: Sep. 26, 1996

[30] Foreign Application Priority Data

Mar. 22, 1995 [DE] Germany .............................. 195 10 288

[51] Int. Cl.[7] .............................. B60T 8/36; F16K 31/06; F16K 27/08
[52] U.S. Cl. .............................. 303/119.2; 303/119.1
[58] Field of Search .................. 303/119.2; 137/495, 137/509, 596.17; 251/129.02, 129.07

[56] References Cited

U.S. PATENT DOCUMENTS

| | | | |
|---|---|---|---|
| 5,318,066 | 6/1994 | Burgdorf et al. | 137/529 |
| 5,474,106 | 12/1995 | Burgdorf et al. | 137/495 |
| 5,603,483 | 2/1997 | Reuter et al. | 251/129.02 |

Primary Examiner—Chris Schwartz
Attorney, Agent, or Firm—Arthur L. Plevy

[57] ABSTRACT

An electromagnetic valve with pressure control function, has on a magnetic core an extension which extends in the direction to valve face. A valve rocker is guided in the radial direction in extension. This yields good guidance of valve rocker which favors flow, outside of the audio spectrum.

20 Claims, 1 Drawing Sheet

6,022,086

ELECTROMAGNETIC VALVE WITH PRESSURE CONTROL FUNCTION

FIELD OF THE INVENTION

The invention relates to an electromagnetic valve with pressure control function, specially for hydraulic motor vehicle brake systems with slip control and/or automatic brake engagement for control of the dynamics of vehicle movement.

BACKGROUND OF THE INVENTION

An electromagnetic valve with pressure control function according to the generic type proceeds from DE 40 28 447 A1. This electromagnetic valve combines the functions of hydraulic control between a brake pressure transmitter and a wheel brake with control of the system pressure in the sense of a hydraulically actuated pressure control valve during drive slip control. To reduce noise behavior the valve rocker is centered within a rocker guide relative to the valve face. For this reason the rocker guide is located on the valve face. However this has the disadvantage that both measures to attach the rocker guide in the valve chamber must be taken and there is also additional production cost for manufacture of the rocker guide. Moreover, the flow behavior in the area of the valve face is adversely affected.

SUMMARY OF THE INVENTION

The object of the invention is to improve an electromagnetic valve of the initially mentioned type such that with low production cost advantageous guidance of the valve rocker arises, which is characterized moreover with respect to the acoustics of the electromagnetic valve by extremely low noise emission and has no adverse effect on the flow behavior.

This object is achieved according to the invention by an extension on the magnetic core which extends in the direction to the valve face, the valve rocker is being guided in the radial direction in extension.

Thus the invention is based on the idea of guiding the valve rocker over a suitable length in the magnetic core, for which in particular an extension attached to the magnetic core is suitable.

Further objects, features, and advantages of the present invention will become more apparent to those skilled in the art as the nature of the invention is better understood from the accompanying drawings and detailed descriptions.

BRIEF DESCRIPTION OF THE DRAWING

For the purpose of illustrating the invention, there is shown in the drawing a form which is presently preferred; it being understood, however, that this invention is not limited to the precise arrangements and instrumentalities shown.

DETAILED DESCRIPTION OF THE PREFERRED EMBODIMENT

Figure 1:
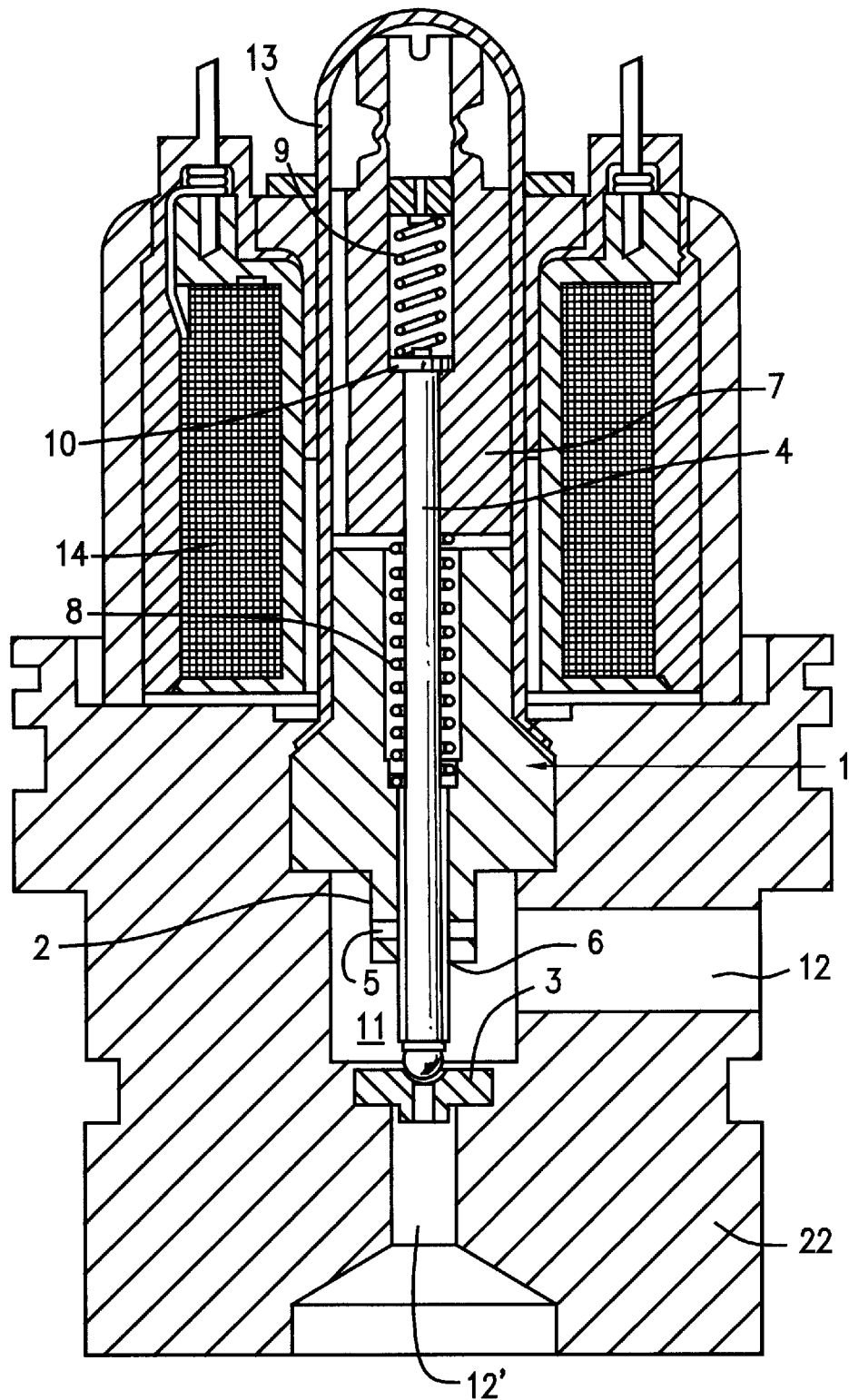
FIG. 1 is a cross-sectional view of an electromagnetic valve in the electromagnetically unexcited open valve switching position.

Referring now to the drawing, wherein like numerals indicate like elements, FIG. 1 shows in cross section an electromagnetic valve in the electromagnetically unexcited open valve switching position. A magnetic core 1 is kept caulked (retained with a high force) in a valve chamber 11 with a valve sleeve 13 which is drawn to be relatively thin-walled from austenitic steel and which holds a magnetic coil 14. The valve chamber 11 is defined by a valve chamber housing 22. A reset spring 8 which is tensioned between the magnetic core 1 and a magnetic armature 7 provides for lifting of a valve rocker 4 from a valve face 3 in the electromagnetically unexcited base position. A pressure control spring 9 located in a coaxial step hole 20 of the magnetic armature 7 keeps the valve rocker 4 in the base position of the valve on its stop 10 within the magnetic armature 7. Between the front of the magnetic armature 7 and the magnetic core 1 there is preferably a non-ferromagnetic disk which however is not further emphasized in the drawing, but which prevents the undesirable and relatively well-known sticking of the magnetic armature 7 on the magnetic core 1 during electromagnetic actuation.

The valve chamber 11 is produced as a cartridge and consists of machining steel so that according to its chamber gradation, it can be held by form- or force-fit for example in a lightweight metal valve receiver body, not shown. A first hydraulic channel 12 which discharges radially at the level of the valve rocker 4 into the valve chamber 11 is joined preferably to a brake pressure transmitter, not shown, while underneath the valve face 3 a second hydraulic channel 12' discharges into the valve chamber 11.

It follows from the figure that according to the invention on the magnetic core 1 there is an extension 2 which extends in the direction to the valve face 3. The extension 2 is preferably made as a sleeve and is joined integrally to the magnetic core 1. Thus the two parts combined with one another can be inserted as a rotary part which is easy to produce in a single assembly process into the valve chamber 11. On the jacket surface of the extension 2 there are a plurality of penetrations 5 which are distributed symmetrically over the periphery and which can be produced by drilling using simple production techniques. The diameter inside of these penetrations 5 made as drill holes is at least greater than or equal to a through opening 6 which holds the valve rocker 4 in the extension 2. The through opening 6 is the area between the valve rocker 4 and the bore in the extension 2. The drill holes (penetrations 5) which are distributed symmetrically over the periphery on the extension 2 are located roughly at half the length of the extension 2.

The length of the extension 2 is at least one fourth of the entire length of the magnetic core 1, the total length of the magnetic core 1 containing the length of the extension 2. The selected total length of the magnetic core 1 yields the guide length which is necessary relative to the length of the valve rocker 4 and which can be varied to a limited degree depending on the clearance fit between the through opening 6 and the shaft cross section of the valve rocker 4. The selected clearance fit as well as the total length of the magnetic core 1 influences friction conditions, viscosity and flow properties during switching operation of the valve. Since the above described total length of the magnetic core 1 and also the size of the annulus to be considered between the magnetic core 1 and the valve rocker 4 with respect to valve acoustics should not cause any adverse phenomena, the electromagnetic valve on its extension has several of above described penetrations 5 in a diametrical arrangement. This ensures that the fluid flowing from the hydraulic channel 12' to the first hydraulic channel 12 in the pressure control function has no high frequency noise in the audio range which would develop among others as resonance phenomena by annular flow between magnetic core 1 and valve rocker 4.

How this electromagnetic valve works is described in the following. Electromagnetic excitation of the magnetic armature 7 causes the valve rocker 4 to move against the relatively weak action of the reset spring 8 in the magnetic core 1 to rest against the valve face 3. In doing so the valve rocker 4 is raised preferably by a small amount of lift from the stop 10 in the magnetic armature 7 so that even in case of wear between the valve rocker 4 and the valve face 3 at any time in the closed position of the electromagnetic valve a tight seal of the hydraulic connection between the first and the second hydraulic channel 12, 12' is ensured. As soon as a pressure rise is registered under the valve face 3 in the second hydraulic channel 12' which exceeds the action of the compressive force of the pressure control spring 9 in the magnetic armature 7, the pressure control function of the electromagnetic valve begins to take effect by moving the valve rocker 4 relative to the magnetic armature 7 in the sense of release of the valve face 3, by which the fluid of the hydraulic channel 12' moves in pulses in the direction of the magnetic core 1 and the first hydraulic channel 12. This is promoted by the fact that before response of the pressure controller function the first hydraulic channel 12 and the magnetic armature space are almost without pressure. The dynamics of the pressure column promoted thereby continues over the small annular cross section between the extension 2 and the valve rocker 4 in the direction of the magnetic armature space. In doing so however hydraulic medium flows via the penetrations 5 in the extension 2. The otherwise well-known high frequency whistling noise can thus be shifted from the convention frequency spectrum of the audio range when the design dimensions of the extension 2 require this.

The present invention may be embodied in other specific forms without departing from the spirit or essential attributes therefore and, accordingly, references should be made to appended claims, rather than to the foregoing specification, as indicating the scope of the invention.

It is claimed:

1. An electromagnetic valve that provides a pressure control function, the valve especially for hydraulic motor vehicle braking systems that control vehicle movement dynamics via slip control or automatic brake engagement, or via slip control and automatic brake engagement, the valve having a magnetic armature, a valve sleeve surrounding the armature and a magnetic coil attached to the valve sleeve, the valve executing a lifting motion via the generation of an electromagnetic actuating force by the armature, that causes a valve rocker partially surrounded by a magnetic core and located in the magnetic armature, to interact with a valve face attached in a valve chamber, the lifting motion of the valve rocker being changeable via the action of a hydraulic actuating force, the valve further having a first hydraulic channel which discharges into the valve chamber in the area of the valve rocker that establishes a connection to a brake pressure transmitter, a second hydraulic channel which discharges into the valve chamber facing away from the valve rocker, the second hydraulic channel being adapted for connection to a pump and at least one wheel brake, the second hydraulic channel being connectable to the first hydraulic channel depending on the rocker position, and an extension on the magnetic core which extends toward the valve face, the extension having a free end that is spaced from the valve face, the extension operating as a guide for the valve rocker to prevent lateral movement thereof.

2. An electromagnetic valve according to claim 1, wherein the extension has at least one penetration.

3. An electromagnetic valve according to claim 2, wherein the at least one penetration has a length that is roughly half the length of the extension.

4. An electromagnetic valve according to claim 3, wherein the length of extension is at least one fourth of the entire length of the magnetic core.

5. An electromagnetic valve according to claim 2, wherein the at least one penetration has a diameter which is at least greater than or equal to a through opening in the extension.

6. An electromagnetic valve according to claim 2, wherein the at least one penetration includes a plurality of penetrations which are distributed symmetrically over the periphery of the extension.

7. An electromagnetic valve according to claim 2, wherein the extension is shaped as a sleeve with a through opening having a diameter which corresponds to the diameter of an opening of the magnetic core.

8. An electromagnetic valve according to claim 1, wherein the extension is shaped as a sleeve with a through opening having a diameter which corresponds to the diameter of an opening of the magnetic core.

9. An electromagnetic valve according to claim 1, wherein the extension is a homogenous component of the magnetic core.

10. An electromagnetic valve that provides a pressure control function comprising:
   a valve chamber housing and a valve sleeve carried by the valve chamber housing, the valve chamber housing defining a valve chamber;
   a magnetic armature surrounded by the valve sleeve;
   a magnetic coil encircling the valve sleeve and adapted to create electromagnetic excitation;
   a magnetic core carried in the valve chamber;
   a valve rocker extending through the magnetic core and the magnetic armature and adapted to be lifted by the electromagnetic excitation created by the magnetic coil;
   a valve face carried in the valve chamber and adapted to interact with the valve rocker;
   a first hydraulic channel which discharges into the valve chamber in the area of the valve rocker;
   a second hydraulic channel which discharges into the valve chamber such that the valve face interposed between the second hydraulic channel and the valve rocker can be connected to the first hydraulic channel depending on the rocker position by the magnetic armature and a hydraulic actuating force; and
   an extension extending toward the valve face from the magnetic core, the extension having an end which is spaced from the valve face , the extension operating as a guide for the valve rocker to prevent lateral movement thereof.

11. An electromagnetic valve according to claim 10, wherein the extension has at least one penetration.

12. An electromagnetic valve according to claim 11, wherein the at least one penetration has a length that is approximately half the length of the extension.

13. An electromagnetic valve according to claim 12, wherein the length of the extension is at least one-fourth of the entire length of the magnetic core.

14. An electromagnetic valve according to claim 11, wherein the at least one penetration has a diameter at least as large as a through opening in the extension.

15. An electromagnetic valve according to claim 11, wherein the at least one penetration includes a plurality of penetrations which are distributed symmetrically over the periphery of the extension.

16. An electromagnetic valve according to claim 11, wherein the extension is shaped as a sleeve with a through opening having a diameter which corresponds to the diameter of an opening of the magnetic core.

17. An electromagnetic valve according to claim 10, wherein the extension is shaped as a sleeve with a through opening having a diameter which corresponds to the diameter of an opening of the magnetic core.

18. An electromagnetic valve according to claim 10, wherein the extension is the same homogenous material as the magnetic core.

19. An electromagnetic valve according to claim 10, wherein the extension is shaped as a sleeve with a through opening having a diameter which corresponds to the diameter of an opening of the magnetic core.

20. An electromagnetic valve according to claim 10, wherein the hydraulic actuating force means includes a pressure control spring located in a coaxial step hole of the magnetic armature for keeping the valve rocker in a base position of the valve and the pressure from the second hydraulic channel.

* * * * *